Patented Mar. 23, 1954

2,673,201

UNITED STATES PATENT OFFICE 2,673,201

COBALTIFEROUS AZO-DYESTUFFS

Christian Zickendraht, Binningen, and Arthur Buehler, Rheinfelden, Switzerland, assignors to Ciba Limited, Basel, Switzerland, a Swiss firm No Drawing. Application August 11, 1952,
Serial No. 303,816

Claims priority, application Switzerland
August 13, 1951

8 Claims. (Cl. 260—147)

According to this invention valuable new cobaltiferous azo-dyestuffs are made by treating a monoazo-dyestuff free from sulfonic acid and carboxylic acid groups and corresponding to the general formula (1)

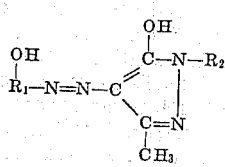

in which $R_1$ represents a benzene radical bound to the azo-linkage in ortho-position relatively to the hydroxyl group and free from sulfonic acid amide groups, and $R_2$ represents a benzene radical containing a sulfonic acid amide group, with an agent yielding cobalt in such manner that the resulting cobaltiferous dyestuff contains less than one atom of cobalt in complex union per molecule of monoazo-dyestuff.

The monoazo-dyestuffs of the above formula used as starting materials in the present process can be prepared by coupling an ortho-hydroxydiazo compound of the benzene series free from sulfonic acid, carboxylic acid and sulfonic acid amide groups with a pyrazolone of the formula

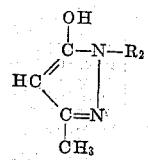

in which $R_2$ has the meaning given above.

Such pyrazolones can be prepared by the usual methods. As examples of such pyrazolones there may be mentioned: 1-phenyl-3-methyl-5-pyrazolone-2'-3'-or 4'-sulfonic acid amide and the corresponding N-methyl-, N-ethyl-, N-isopropyl-, N-n-butyl-, N-dimethyl-, N-diethyl-, N-β-hydroxyethyl-, N-phenyl-, N-ethylphenyl- or N-cyclohexyl-amide, and also 1-phenyl-3-methyl-5-pyrazolone-3'- or -4'-sulfonic acid morpholide and 1-phenyl-3-methyl-5-pyrazolone-3'-sulfonic acid pyrrolidide, 1 - phenyl - 3 - methyl - 5 - pyrazolone-2'-methyl-5'-sulfonic acid amide, 1-phenyl - 3 - methyl - 5 - pyrazolone - 2' - chloro - 5'-sulfonic acid amide or 1-phenyl-3-methyl-5-pyrazolone-4'-methyl-5'-sulfonic acid amide.

As ortho-hydroxy-diazo-compounds of the benzene series there come into consideration for making the dyestuffs used as starting materials in the present process, diazo-compounds of ortho-hydroxy-amines of the benzene series of which the benzene nucleus may contain, in addition to the hydroxyl and amino groups, further substituents free from sulfur, such as halogen atoms (for example, chlorine), alkyl groups (for example, methyl), alkoxy groups (for example, methoxy), nitro groups, —CO-alkyl groups (for example, —CO—CH$_3$), and acylamino groups (for example, acetylamino). Especially valuable are 6-nitro-4-methyl- or -4-chloro-2-amino-1-hydroxybenzene, 6-chloro-4-methyl- or -4-nitro-2-amino-1-hydroxybenzene, 4-nitro-, 4-methyl-, 4-chloro- or 4-acetylamino-2-amino-1-hydroxybenzene, 5-nitro-2-amino-1-hydroxybenzene, 4-methyl- or 4-chloro-5-nitro-2-amino-1-hydroxybenzene, 4 - nitro - 6 - acetylamino - 2 - amino - 1 - hydroxybenzene, 6 - nitro - 4 - acetylamino - 2 - amino - 1 - hydroxybenzene, 4:6 - dinitro - 2 - amino - 1 - hydroxybenzene, 4:6 - dichloro - 2 - amino - 1 - hydroxybenzene, 3,4,6 - trichloro - 2 - amino - 1 - hydroxybenzene, 4 - methoxy - 5 - chloro - 2 - amino - 1 - hydroxybenzene, 4 - tertiary - amyl - 6 - nitro - 2 - amino - 1 - hydroxybenzene, 3 - amino - 4 - hydroxyacetophenone, 5 - nitro - 3 - amino - 4 - hydroxyacetophenone, 4 - methoxy - 2 - amino - 1 - hydroxybenzene or 6-acetylamino-4-chloro-2-amino-1-hydroxybenzene, and also 2-amino-1-hydroxybenzene-4-carboxylic acid amide.

The coupling of the ortho-hydroxydiazo-compounds with the pyrazolones can be carried out by the usual known methods, for example in a weakly acid to alkaline medium.

After the coupling reaction is finished the dyestuffs, for the purpose of metallization, can easily be separated from the coupling mixture by filtration, if desired, after the addition of sodium chloride. They are advantageously used for metallization in the form of filter cakes without intermediate drying. In some cases it is possible to carry out the metallization directly in the coupling mixture without intermediate separation.

The monoazo-dyestuffs serving as starting materials in the present process and obtainable as described above are in part new. They are in general not especially easily soluble in water even in the form of their alkali compounds. However, some of them are sufficiently soluble in that form for use in dyeing wool from dyebaths which require no addition of acid.

The treatment with the agent yielding cobalt is carried out in the present invention in such manner that a cobaltiferous dyestuff is obtained which contains less than one atom of cobalt in complex union per molecule of monoazo-dyestuff. Accordingly, the metallization is advantageously carried out with such agents yielding cobalt and by such methods as lead to the formation of complex cobalt compounds having that constitution.

It is generally desirable to use a quantity of the agent yielding cobalt which corresponds to less than one atomic proportion of cobalt for each molecular proportion of dyestuff and/or to conduct the metallization in a weakly acid to alkaline medium. Therefore, there are especially suitable for carrying out the process those agents yielding cobalt which are stable towards alkaline media, for example, cobalt compounds of aliphatic dicarboxylic acids or ortho-hydroxy-carboxylic acids, which contain the cobalt in complex union. Simple compounds of divalent cobalt such as cobalt sulfate or cobalt acetate or, if desired, cobalt hydroxide can also be used with advantage.

The conversion of the dyestuffs into the complex cobalt compounds is advantageously carried out at a raised temperature, under atmospheric or superatmospheric pressure, and, if desired, in the presence of suitable additions, for example, salts of organic acids, bases, organic solvents or other agents assisting the formation of complexes.

In a special form of the process a mixture of two different metallizable monoazo-dyestuffs is used as starting material, both of which dyestuffs correspond to the above Formula 1 or one of which corresponds to that formula and the other is an ortho:ortho'-dihydroxy-monoazo-dyestuff of the benzene-azo-naphthalene type.

As monoazo-dyestuffs of the benzene-azo-naphthalene type there come into consideration for the last-mentioned form of the process, more especially those of the β-naphthol series, for example, those obtainable from 2-hydroxynaphthalene, 6-bromo-2-hydroxynaphthalene or 1-acylamino-7-hydroxy-naphthalenes and ortho-hydroxy-diazo-compounds of the benzene series such as diazotized 2-amino-1-hydroxybenzene sulfonic acid amides or the other diazo-compounds mentioned above.

In this form of the process also it will be understood that the treatment with the agent yielding cobalt is carried out in such manner that the resulting cobaltiferous dyestuff contains less than one atom of cobalt in complex union per molecule of monoazo-dyestuff.

The products of the invention are new. They are cobalt compounds which contain two monoazo-dyestuffs in a complex in which the ratio of the number of cobalt atoms in complex union to the number of molecules of monoazo-dyestuffs bound in complex union to cobalt is smaller than 1:1, and is advantageously about 1:2, and in which the two monoazo-dyestuffs present are ortho:ortho'-dihydroxy-monoazo-dyestuffs free from sulfonic acid and carboxylic acid groups, one of which dyestuffs corresponds to the general Formula 1 and the other of which also corresponds to that formula or is of the benzene-azo-naphthalene type. Valuable are the cobalt compounds of this type which contain two monoazo-dyestuffs both of which correspond to the general Formula 1, but above all those which contain two monoazo-dyestuffs of the same constitution.

The new cobaltiferous dyestuffs are soluble in water and in weakly acid aqueous media and are indeed more soluble than the cobalt-free dyestuffs from which they are made. They are suitable for dyeing or printing a very wide variety of materials, and principally for dyeing nitrogenous natural materials such as silk, leather and especially wool, but are also suitable for dyeing or printing synthetic fibers of superpolyamides or superpolyurethanes. They are suitable for dyeing from weakly alkaline, neutral or weakly acid baths, especially acetic acid baths. The wool dyeings so produced are distinguished by their level character, very good properties of wet fastness and very good fastness to light.

The following examples illustrate the invention, the parts and percentages being by weight.

Example 1

4.52 parts of the dyestuff from diazotized 4-nitro-6-chloro-2-amino-1-hydroxybenzene and 1-phenyl-3-methyl-5-pyrazolone-3'-sulfonic acid amide are dissolved in 150 parts of water and 2.6 parts of sodium hydroxide solution of 30 per cent. strength and, after the addition of 30 parts of a cobalt sulfate solution having a content of cobalt of 1.05 per cent., the mixture is stirred for 30 minutes at 80–85° C. At the end of this period the formation of the complex is finished. The mixture is filtered and the filtrate is evaporated in vacuo. The cobaltiferous dyestuff so obtained is a water-soluble powder which dissolves in concentrated sulfuric acid with an orange-yellow coloration and in sodium carbonate solution with an orange coloration, and dyes wool from a weakly alkaline, neutral or acetic acid bath brownish yellow tints of good fastness to washing and light.

Similar dyestuffs are obtained by treating the monoazo-dyestuffs, obtained from the diazo- and coupling components given in columns I and II of the table below, in the manner described above with an agent yielding cobalt. The tints of the dyeings produced on wool with the complex cobalt compounds are given in column III.

| | I | II | III |
|---|---|---|---|
| 1 | 4-nitro-2-amino-1-hydroxybenzene. | 1-phenyl-3-methyl-5-pyrazolone-3'-sulfonic acid amide. | brownish yellow. |
| 2 | 5-nitro-2-amino-1-hydroxybenzene. | ...do... | red. |
| 3 | 4-chloro-2-amino-1-hydroxybenzene. | ...do... | brownish orange. |
| 4 | 4-nitro-6-chloro-2-amino-1-hydroxybenzene. | 1-phenyl-3-methyl-5-pyrazolone-3'-sulfonic acid-N-methylamide. | Do. |
| 5 | ...do... | 1-phenyl-3-methyl-5-pyrazolone-3'-sulfonic acid-N-β-hydroxyethylamide. | brownish yellow. |
| 6 | ...do... | 1-phenyl-3-methyl-5-pyrazolone-3'-sulfonic acid-N-phenylamide. | Do. |
| 7 | 4:6-dichloro-2-amino-1-hydroxybenzene. | 1-phenyl-3-methyl-5-pyrazolone-4'-sulfonic acid amide. | Do. |
| 8 | ...do... | 1-phenyl-3-methyl-5-pyrazolone-3'-sulfonic acid amide. | Do. |

Example 2

18.3 parts of the dyestuff, obtained from diazotized 5-nitro-2-amino-1-hydroxybenzene and 1-acetylamino-7-hydroxynaphthalene, and 19.6 parts of the dyestuff, obtained from diazotized 4-chloro-2-amino-1-hydroxybenzene and 1-phenyl-3-methyl-5-pyrazolone-3'-sulfonic acid amide are dissolved in 2000 parts of water with the addition of 15 parts of sodium hydroxide, and mixed at 80° C. with 100 parts of a solution of cobalt sulfate having a cobalt content of 3.25 per cent. After stirring for ½ hour at 80° C. the metallization is finished. Upon neutralization with acetic acid the cobalt complex separates out while the mixture is still hot. It is filtered off and, when dry, it is a dark powder which dyes wool from a weakly alkaline, neutral or acetic acid bath level brown tints.

In the following table are given further complex cobalt compounds of ortho:ortho'-dihydroxy-azo-dyestuffs which can be made in the manner described above. In columns I and II are given the two ortho:ortho'-dihydroxy-azodyestuffs bound in complex union to cobalt, and in column III are given the tints produced by dyeing wool with the mixed complex from an acetic acid bath.

| | I. | II. | III |
|---|---|---|---|
| 1 | 4-chloro-2-amino-1-hydroxybenzene → 1-phenyl-3-methyl-5-pyrazolone-3'-sulfonic acid amide. | 4-nitro-6-chloro-2-amino-1-hydroxybenzene → 1-phenyl-3-methyl-5-pyrazolone-3'-sulfonic acid-N-phenylamide. | brownish orange. |
| 2 | ...do... | 4-nitro-6-chloro-2-amino-1-hydroxybenzene → 1-phenyl-3-methyl-5-pyrazolone-3'-sulfonic acid amide. | Do. |
| 3 | ...do... | 2-amino-1-hydroxybenzene-4-sulfonic acid amide → 2-hydroxynaphthalene. | bordeaux. |

*Example 3*

100 parts of well wetted wool are entered at 40–50° C. into a dyebath which contains in 4000 parts of water 1 part of the cobaltiferous dyestuff obtainable as described in the first paragraph of Example 1, and 10 parts of crystalline sodium sulfate. 3 parts of acetic acid of 40 per cent strength are added, and the bath is raised to the boil in the course of ½ hour and dyeing is carried on for ¾ hour at the boil. The wool is finally rinsed with cold water and dried. There is obtained a brownish yellow dyeing of very good fastness to washing and light.

The same result is obtained when no acetic acid is added to the dyebath.

A brownish yellow dyeing is also obtained when superpolyamide fibers (nylon fibers) are used instead of wool.

What is claimed is:

1. A complex cobalt compound containing two monoazo dyestuffs so bound in complex union with a cobalt atom that the proportion of the number of atoms of cobalt bound in complex combination to the number of monoazo dyestuff molecules is smaller than 1:1 and advantageously about 1:2, and in which the two monoazo dyestuffs present are free from sulfonic acid and carboxylic acid groups and one of them corresponds to the formula

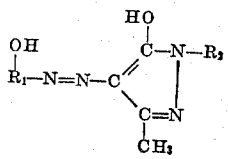

wherein $R_1$ represents a benzene radical bound to the azo linkage in ortho-position relatively to the hydroxyl-group and free from sulfonic acid amide groups, and $R_2$ represents a benzene radical containing a sulfonic acid amide group, the other monoazo dyestuff present in the complex being selected from the group consisting of a monoazo dyestuff which corresponds to the aforesaid formula and an ortho:ortho'-dihydroxy-monoazo dyestuff of the benzene-azo-β-naphthol series.

2. A complex cobalt compound containing two monoazo dyestuffs so bound in complex union with a cobalt atom that the proportion of the number of atoms of cobalt bound in complex combination to the number of monoazo dyestuff molecules is smaller than 1:1 and advantageously about 1:2, and in which the two monoazo dyestuffs present are free from sulfonic acid and carboxylic acid groups, contain a single sulfonic acid amide group, and correspond to the formula

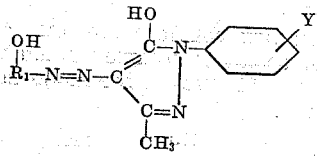

wherein Y represents the single sulfonic acid amide group present in the monoazo dyestuff molecule and $R_1$ represents a benzene radical bound to the azo linkage in ortho-position relatively to the hydroxyl group.

3. A complex cobalt compound containing two monoazo dyestuffs so bound in complex union with a cobalt atom that the proportion of the number of atoms of cobalt bound in complex combination to the number of monoazo dyestuff molecules is substantially 1:2, and in which both monoazo-dyestuffs present are free from sulfonic acid and carboxylic acid groups, contain a single sulfonic acid amide group and correspond to the formula:

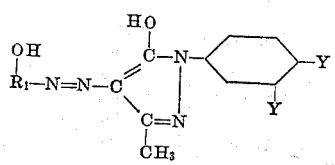

wherein one Y represents a hydrogen atom, the other Y represents the single sulfonic acid amide group present in the monoazo dyestuff molecule and $R_1$ represents a benzene radical containing as sole substituents at least one and at most two substituents selected from the group consisting of a chlorine atom and a nitro group.

4. A complex cobalt compound according to claim 3, wherein both monoazo dyestuffs present have the same constitution.

5. A complex cobalt compound containing two monoazo dyestuffs so bound in complex union with a cobalt atom that the proportion of the number of atoms of cobalt bound in complex combination to the number of monoazo dyestuff molecules is substantially 1:2, and in which both monoazo dyestuffs present correspond to the formula

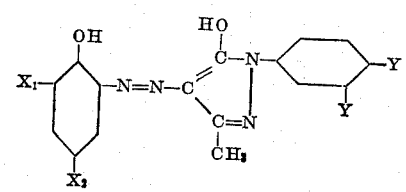

wherein $X_1$ represents a member selected from the group consisting of a chlorine and a hydrogen atom, $X_2$ represents a member selected from the group consisting of a chlorine atom and a nitro group, one Y represents a hydrogen atom and the other Y a substituent of the formula —$SO_2NHC_{n-1}H_{2n-1}$ wherein $n$ is a whole number up to 2.

6. The complex cobalt compound containing one atom of cobalt in complex union with substantially two molecules of the monoazo dyestuff of the formula

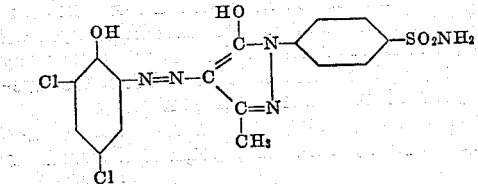

7. The complex cobalt compound containing one atom of cobalt in complex union with substantially two molecules of the monoazo dyestuff of the formula

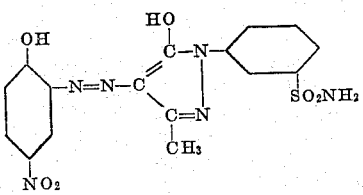

8. The complex cobalt compound containing one atom of cobalt in complex union with substantially two molecules of the monoazo dyestuff of the formula

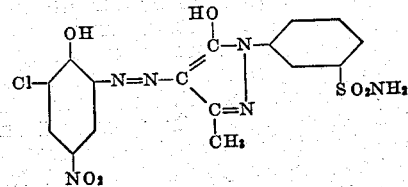

CHRISTIAN ZICKENDRAHT.
ARTHUR BUEHLER.

References Cited in the file of this patent

UNITED STATES PATENTS

| Number | Name | Date |
|---|---|---|
| 1,623,005 | Gubler et al. | Mar. 29, 1927 |
| 2,104,357 | Straub et al. | Jan. 4, 1938 |
| 2,443,226 | Carson | June 15, 1948 |
| 2,610,175 | Widmer et al. | Sept. 9, 1952 |

FOREIGN PATENTS

| Number | Country | Date |
|---|---|---|
| 119,901 | Switzerland | Apr. 16, 1927 |
| 133,100 | Switzerland | Aug. 1, 1929 |